United States Patent [19]

Jowett et al.

[11] 4,154,675

[45] May 15, 1979

[54] ION EXCHANGE PROCESSES USING CELLULOSIC MATERIALS

[75] Inventors: George E. Jowett, Uplands; David T. Jones, Ystalyfera, both of Wales

[73] Assignee: Viscose Group Limited, England

[21] Appl. No.: 835,493

[22] Filed: Sep. 22, 1977

Related U.S. Application Data

[63] Continuation-in-part of Ser. No. 366,565, Jun. 4, 1973, abandoned.

[30] Foreign Application Priority Data

Jun. 2, 1972 [GB] United Kingdom ............... 25902/72

[51] Int. Cl.² ............................................. B01D 15/04
[52] U.S. Cl. ......................................... 210/33; 210/34; 210/40
[58] Field of Search ....................... 210/19, 24, 27, 33, 210/44, 49, 189, 209, 219, 34, 40, 500 R, 502, 59, 60; 260/2.1 R, 2.2 R; 536/57

[56] References Cited

U.S. PATENT DOCUMENTS

| 2,697,724 | 12/1954 | Collier | 210/33 |
| 3,573,277 | 3/1971 | Grant | 260/2.2 R |
| 3,697,419 | 10/1972 | Grant | 210/27 |
| 3,905,954 | 9/1975 | Jones et al. | 210/500 R |

FOREIGN PATENT DOCUMENTS 1226448   3/1971   United Kingdom.

Primary Examiner—Charles N. Hart
Assistant Examiner—Ivars Cintins
Attorney, Agent, or Firm—Kane, Dalsimer, Kane, Sullivan and Kurucz

[57] ABSTRACT

Cellulosic ion-exchange materials, 0–10% cross-linked, are used to extract dissolved materials (especially those giving large ionic species) from liquid media by ion-exchange interaction conducted under agitated conditions produced by an agitator located in the reaction zone or by certain turbulence-inducing arrangements. The cellulosic material can be recirculated to treat further liquid, and the process is particularly suited to continuous operation.

19 Claims, 6 Drawing Figures ial. 2. Brief Description of the Prior Art

ION EXCHANGE PROCESSES USING CELLULOSIC MATERIALS

CROSS-REFERENCE TO RELATED APPLICATION

This application is a continuation-in-part of U.S. application Ser. No. 366,565 filed June 4, 1973 and now abandoned.

BACKGROUND OF THE INVENTION

1. Field of the Invention This invention relates to an ion-exchange process for extracting dissolved material from a liquid medium using cellulosic ion-exchange material.

2. Brief Description of the Prior Art

It has previously been customary to use cellulosic ion-exchange materials in packed-bed systems, in which the ion-exchange material is essentially static. Thus, for example, British patent specification No. 1,227,906 describes a process for removing protein and/or fat from liquid waste effluent, in which the effluent is passed through a static, packed bed of cellulosic ion-exchange material. The effluent treatment is discontinued after a time and the packed bed of ion-exchange material is then regenerated in situ for re-use.

SUMMARY OF THE INVENTION

The present invention provides a process for extracting dissolved material from a liquid medium using a particulate cellulosic ion-exchange material selected from the group consisting of non-cross-linked cellulosic ion-exchange materials and cellulosic ion-exchange materials cross-linked to an extent not greater than 10% (expressed in terms of the weight of the cross-linking agent and the dry weight of the cellulose), which process comprises:

(a) causing ion-exchange interaction between the liquid and the cellulosic ion-exchange material by contacting the liquid with the cellulosic material in a reaction vessel under agitated conditions which are such that the cellulosic particles are in mutual relative motion and in motion relative to the vessel, said agitated conditions being produced by agitator means located within the reaction vessel and acting directly on the suspension of cellulosic particles and liquid in the vessel;

(b) separating reacted ion-exchange material bearing the extracted material from the resulting mixture of reacted ion-exchange material and treated liquid.

In another form of the process of the invention, the agitated conditions are produced by turbulence-inducing means which may comprise means for inducing vortex conditions in the reaction vessel or means for introducing the liquid medium into the vessel in the form of one or more jets.

Each possible method of producing agitated conditions in the process of the invention involves localised energy input to the suspension, which subjects the cellulose particles to correspondingly high local shearing stress. Indeed, in a typical process conducted according to the invention, the maximum shear rate may be as much as 400 times that in a typical static-bed system.

The process of the present invention avoids the disadvantages associated with the static-bed ion exchange treatment systems hitherto conventionally used for cellulosic ion-exchange materials. These disadvantages include blockages, undesirably high resistance to flow (especially in deep beds), and relatively low tolerance of solid material suspended in the liquid, necessitating extensive coagulation and filtration pre-treatment to effect solids removal. A consequence of the high inherent flow resistance of packed beds is that relatively highly cross-linked ion-exchange materials must be used to achieve useful flow rates. High cross-linking inevitably detracts from the protein exchange capacity of the material. By contrast, in the process of the present invention, satisfactory flow can be achieved even at low cross-linking of the cellulose material. Further, the present invention avoids the undesirable channelling of the flowing liquid that can occur in a static-bed system.

DETAILED DESCRIPTION OF THE INVENTION

Figure 1:
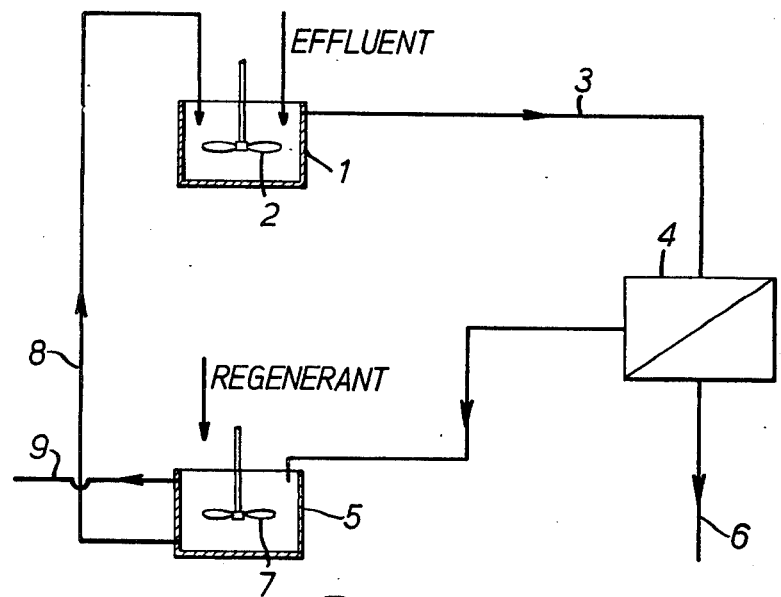
FIGS. 1, 2 and 4-6 are flow diagrams of five different embodiment processes of the invention, FIG. 5 incorporating a vertical section view of a treatment vessel.

A particular feature of the process of the invention is that the residual concentration of dissolved material in the output liquid can be made relatively constant, whereas the residual concentration tends to vary considerably in previously proposed systems involving alternate ion exchange treatment in a static-bed and bed regeneration. Further, when the bulk of the regenerated material is recycled to treat further liquid, the process of the invention enables a surprisingly large volume of liquid to be treated per unit volume of ion exchange material. Indeed, in a typical case, as much as six times more cellulosic ion-exchange material may be needed to treat a given quantity of liquid in a packed-bed system as compared with a process according to the invention.

In view of the known properties of cellulosic materials, it is surprising that the process of the invention can be used with practical success. As is very well-known, cellulosic materials tend to absorb large quantities of liquid media, more especially aqueous media, in which they are immersed, and as a result the cellulose swells to form a mechanically weak porous structure. The ion-exchange treatment stage of the process of the present invention is carried out under agitated conditions in which the cellulose particles are in mutual relative motion and in motion relative to the reaction vessel. Such conditions inevitably subject the cellulosic material to significantly greater shearing stress and abrasion than a conventional static-bed system. Moreover, as already noted, the process of the invention subjects the cellulose particles to much higher local shearing stress.

Surprisingly, however, it has been found that cellulosic ion-exchange materials can be used satisfactorily in the agitated systems of the invention. This is all the more unexpected in the case of the cellulosic ion-exchange materials used according to the invention which are either non-cross-linked or cross-linked only up to a maximum of 10% (see U.S. Pat. No. 3,905,954 formerly application Ser. No. 273,766). It would have been expected that the mechanically weak swollen material resulting from liquid absorption would break up to yield a high proportion of fine particles, giving either an unprocessable viscous solution or gel or, in a system operated with selective recirculation of ion-exchange material according to size, loss of the non-circulated fine particles would be expected to lead to completely uneconomic operation.

The fundamental differences between the process of the present invention and conventional packed-bed systems for utilising cellulose ion-exchange materials are illustrated by the so-called "particle hold-up" values, that is to say, the ratio of the dry weight of the particles to the volume in which they are dispersed (the "active" volume). Typical particle hold-up values in the process of the present invention will be in the range of from 8–14% w/v, more especially 8–10% w/v, and can be as low as about 2% w/v. The particle hold-up in a packed bed will of course be much higher.

The process of the invention is conducted without substantial disintegration of the cellulosic particles. Advantageously, any transfer of the cellulose, for example, to a separating zone, is effected with an air-lift pump or an alternative which imposes only equivalent shear stress on the particles, thereby minimising any damage to the particles.

The separated ion-exchange material from step (b) of the process may be used to treat a further quantity of liquid, and/or the liquid obtained from step (b) may be subjected to further ion-exchange extraction according to step (a) or, if desired, by another process.

The objective may be to increase the content of extracted material adsorbed onto the cellulose ion-exchange material, in which case the cellulose is re-used without intervening de-sorption by regeneration. On the other hand, the objective may be to effect a further reduction in the residual content of the dissolved material in the liquid, in which case the liquid from step (b) may be subjected to further treatment, optionally with the cellulose from step (b), with or without intervening regeneration, and/or with fresh ion-exchange material.

Advantageously, at least part of the separated ion-exchange material from step (b) is regenerated to de-sorb extracted material therefrom and is then re-circulated to treat a further quantity of liquid. The sequence comprising steps (a), (b) and the subsequent regeneration and re-circulation may be repeated at leaast ten times for a given batch of the cellulosic ion-exchange material, and further repetition of the sequence will in general be economically desirable and practicable, say, a total of at least 20 cycles.

Examples of dissolved material which may be extracted by the process of the invention include organic polyelectrolytes such as, for instance, proteins, for example, enzymes and components of blood and tissue which may in addition comprise breakdown products such as peptides and amino acids; carbohydrates, for example, charged polysaccharides such as muco-polysaccharides; nucleic acids, for example, ribonucleic acids and deoxyribonucleic acids; long-chain fatty acids, dyestuffs, for example, Congo Red, and quaternary ammonium compounds.

In the case of protein extraction, the liquid medium may be of animal, fish or vegetable origin, for example, egg white or milk; or a liquid extract or waste effluent such as soya whey, milk whey or extracts from rape seed, groundnuts, palm nuts, sunflower seeds, or olives; or blood (for example, abattoir effluent). Thus, for instance, an extracted protein may be an albumen, for example, egg albumen, lactalbumen or serum albumen, or a globulin, for example, lactoglobulin, or casein.

The process of the invention may be carried out in order to recover valuable materials from liquid media (as in the instances from food technology given above) and/or for purification purposes, for example, extraction of organic pollutants from waste effluents, or purification of water for domestic use. Further, the process may be employed as one of a series of treatments carried out on a liquid medium, for example, a waste effluent.

The degree of cross-linking is in the range of from 0 to 10%, for example, 0.1–5%, and the value chosen will depend on the desired exchange capacity for large ions and on the desired liquid-retention, flow properties, and dimensional stability. It will be appreciated that maximum ion-exchange capacity for polyelectrolytes and other large ions is not compatible with extensive cross-linking because, although high cross-linking strengthens the cellulose structure, it also reduces the extent to which the ion exchange groups are accessible.

Advantageously, substantially the whole of the spent ion exchange material separated from the treated liquid is regenerated and recirculated. In certain cases, however, the spent ion exchange material bearing the extracted substance may be a useful starting material for procedures in which the substance is modified while the ion exchange material acts as a support therefor. According, therefore, to a modification of the process of the invention, at least part of the spent ion exchange material is not regenerated or recirculated.

The agitated conditions in the ion-exchange treatment zone may be produced by agitator means located within the treatment vessel and acting directly on the suspension of cellulosic particles and liquid. Thus, for example, the agitation may be produced by means of one or more impellers, which may be arranged to execute rotary or oscillatory motion as desired. Preferably, the impeller is one having blades of hydrofoil cross-section, as this reduces the attritive effect of the blades on granular ion exchange material. As will be appreciated by those skilled in the art, the term "hydrofoil cross-section" in this context denotes a blade which is shaped to produce agitation in conjunction with liquid/solid transfer in a direction generally parallel to the axis of rotation of the blade. Instead, the impeller may be shaped to produce radial flow.

In one form of process according to the invention, an impeller provided to produce the agitated conditions is itself part of a pump which causes circulation of the cellulose/liquid suspension through an external vessel.

As a further possibility, the agitator means may comprise an ultra-sonic vibrator.

In some instances, it may be advantageous to agitate the treatment vessel by external means, in addition to effecting localized internal agitation in accordance with the invention.

Agitated conditions may also be produced by vortex-inducing means. Thus, for example, vortex conditions may be generated by causing the liquid that is to be treated to flow obliquely into a treatment vessel. The ion-exchange material may then be introduced into the vessel from above.

Another method of producing turbulence in the reaction vessel comprises introducing the liquid medium in the form of a jet produced by forcing the liquid through one or more narrow orifices.

In one form of process according to the invention, the treatment zone may be located in a generally tubular vertical chamber having mechanical impellers, or other agitation-producing means, disposed at various heights. In operation, mixed liquid and ion exchange material flows downwardly through the reaction chamber and past the agitator or agitators.

The process may instead be conducted by establishing a flowing turbulent stream of admixed liquid and ion exchange material, which may be passed, for example, along a pipe-line reactor, or through a labyrinth vessel, which may be provided with horizontal or vertical baffles, and will incorporate localized agitator means. Labyrinth vessels have the advantage that, as compared with an unbaffled stirred tank, the contact time between reactants is more easily controlled. Difficulties may arise, however, from the tendency of solid materials to settle unduly in labryrinth vessels, and it may be desirable to provide additional baffles to reduce eddying.

It may be advantageous in some instances to adopt a combination of two or more of the foregoing methods of generating agitated conditions in the treatment zone.

Although it will generally be preferable to maintain the treatment zone under conditions of continuous agitation, it may sometimes be advantageous to interrupt the agitation at intervals or to operate in a pulsed manner.

More than one treatment vessel may be provided and a series and/or parallel arrangement may then be utilized. The number and arrangement of treatment vessels to be used will depend on the nature and concentration of the dissolved material that is to be removed, and on the type of ion exchange material available.

In the case of some liquid media, and especially in the case of certain effluents it may be necessary or desirable to exercise control over the pH used at different process stages. For example, in the case of a typical cationic ion-exchange material, adsorption may be effected at pH 3 and desorption at pH 9, while for a typical anionic exchange material, adsorption may be effected at pH 9 and desorption at pH 3.

The separation of treated liquid from reacted ion-exchange material may be carried out in situ. Thus, for example, there may be provided a filter screen across a liquid outlet in the side of the reaction vessel or across a liquid outlet in the base of the vessel. Instead, the ion-exchange material may be contained in an inner filter cage in which the ion-exchange interaction takes place and through which the treated liquid can pass into an outer housing and thence to a suitable outlet.

Preferably, however, the product mixture is passed to a separation zone where they may be provided a filter, for example, a rotary vacuum filter. Conveniently, the separation is conducted in a parallel arrangement of at least two filter boxes, one of which is back-washed while the other is used for filtration. Instead, the separation may be conducted in a settling tank or a centrifuge.

An advantageous arrangement utilizing a settling tank (which is preferably tapered inwardly towards its base) comprises a vertically-disposed generally tubular treatment vessel which opens at its base into the settling tank.

In general, complete separation of ion exchange material from the liquid may be impracticable, and there may be a relatively small residual quantity of treated liquid in admixture with the ion exchange material leaving the separator.

The mean residence time of the ion exchange material in the treatment zone is advantageously in the range of from 2 to 60 minutes.

The cellulosic ion-exchange material may be either wholly or only partly spent before being separated from the treated liquid.

The cellulose particles may be of regular or irregular shape, for example, spherical, spheroidal, platelets, or filaments. The cellulose preferably has dry particle sizes in the range of from 40 or 50 to 100 mesh (B.S.S.), a typical average being 250$\mu$, and may have a specific gravity in the range of from 1.05 to 1.50.

If desired, two or more particulate cellulosic ion exchange media having different (or, preferably, opposed) settling characteristics may be used, each being withdrawn from the treatment vessel (in suspension in treated liquid) at a corresponding level. The mixed solids may be admitted to a central region of a treatment vessel, whereupon the fast-settling material accumulates at the base of the vessel and is withdrawn therefrom, and the slow-settling material remains in the centre portion of the vessel or is induced to flow upwardly by the action of flotation means. An individual separation and regeneration system is provided for each ion-exchange material.

The ion-exchange material may be one based on natural cellulose, but is advantageously one based on a regenerated cellulose. More especially, the ion-exchange material is one made by reacting cellulose or a cellulose derivative with an activating substance containing one or more ionisable chemical groups which impart ion-exchange properties to the cellulose reaction product, and thereafter regenerating that product. Materials of that general type are described in U.S. Pat. No. 3,905,954. The activating substance will normally be monomeric, although polymeric material can be used. Ion exchange materials produced by that process are especially useful for use in the present process, in that they have good mechanical stability, possess a relatively large effective area, and have relatively high exchange capacities for large ions such as those derived from proteins. The cellulosic ion exchange material may be instead be one prepared from a regenerated cellulose starting material by the process described and claimed in British patent specification No. 1,226,448.

It will be understood that the term "regenerated," which is used to describe the cellulose from which a suitable ion-exchange material may be obtained, refers to the process of rendering natural cellulose soluble and subsequently precipitating the cellulose in the form required. This latter precipitation is the step known as "regeneration." It will be appreciated that this use of the term is quite different from its use to describe the process of treating spent ion-exchange material to desorb extracted material and prepare the ion-exchange material for re-use. Regeneration of ion exchange material in this latter sense may be effected simply by contacting the material with a suitable regenerant, caustic soda or common salt being suitable in many cases.

It will of course be appreciated that the choice of cellulosic ion exchange material will be influenced to some extent by the nature of the dissolved material that is to be removed from the liquid medium.

The regeneration of spent ion exchange material may also be effected under agitated conditions. Instead, a static-bed system may be employed, or the spent material may simply be steeped with a regenerant solution. The eluate from the regeneration system contains the dissolved material originally extracted from the liquid medium, which material may be recovered by any suitable method. Appropriate adjustment of the pH of the eluate will generally suffice to cause precipitation of the extracted material, and this method of recovery is especially useful in the case of proteinaceous and fatty materials. Instead, the eluate may be concentrated, for example, by gel filtration, reverse osmosis, or by a molecular sieve technique, and then dried, for example, by vacuum- or spray-drying, The process of the invention is especially well suited to continuous operation, and there is preferably a continuous flow of liquid and ion exchange material into and through the treatment zone. In some cases, the rate of withdrawal of treated liquid and spent ion exchange media from the treatment zone may be such as to allow periodic interruption in the introduction of fresh ion exchange material and/or liquid for treatment, but the process preferably comprises continuously introducing fresh ion exchange material and liquid into the treatment zone, and continuously withdrawing from that zone treated liquid admixed with predominantly spent ion exchange material. Advantageously, in a process where the ion-exchange material is regenerated and then recirculated, the throughput of the ion-exchange material in the adsorption stage is substantially equal to the throughput in the regeneration (de-sorption) stage.

Continuous forms of the process of the invention are especially advantageous in that they are readily controllable. Thus, by monitoring the composition of the treated liquid from the treatment zone and making appropriate adjustments to the rate of introduction of ion exchange resin and/or liquid for treatment, the composition of the treated liquid can be maintained substantially uniform.

Before being subjected to ion exchange treatment in accordance with the invention, the liquid may if necessary be subjected to purification to remove suspended solids. Such preliminary purification may comprise passing the liquid through a screen, a fat trap, and/or filtration means. Because, however, the agitated treatment zone of the invention has a relatively high solids tolerance, correspondingly less preliminary solids removal is needed as compared with, for example, a static-bed system.

After being subjected to ion exchange treatment in accordance with the invention, the treated liquid may be subjected to additional purification and/or treatment. Examples of further purification treatments which may be effected include chlorination, dissolved gas removal, removal or organic materials by an activated carbon or a catalytic system, and oxidation, for example, by aeration or biological action. More than one such treatment may be employed. Additionally, or alternatively, the effluent may be subjected to further ion exchange treatment, which may be effected in a conventional static bed or, as hereinbefore described, by repeating the process of the present invention. In the latter case, regeneration of ion exchange material after the said further ion exchange treatment may be effected in the same system as is used to effect regeneration in the main process. The distribution of regenerated material from the said system between the purification of further waste effluent and additional purification of the once-treated effluent, may be controlled as desired. Instead, two different types of ion exchange material may be used in the two treatments, in which case separate regeneration systems will be needed. Thus, for example, a first ion-exchange treatment in accordance with the invention may be performed with a cationic or anionic ion-exchange material, and a subsequent treatment may then be performed with a complementary ion-exchange material.

Ion exchange material in circulation in the process of the invention may be supplemented or replaced as desired by fresh ion exchange material.

Several forms of process in accordance with the invention will now be described, by way of example, with reference to the accompanying drawings of FIGS. 1-6, inclusive.

The processes described with reference to FIGS. 1 to 6 may be carried out using any cellulosic ion-exchange material which is cross-linked to an extent not exceeding 10%, or is non-cross-linked. Preferably, however, the material comprises a regenerated cellulose, more especially a cellulose into which ion-exchange groups have been introduced before regeneration.

Referring to FIG. 1, waste effluent is fed to a treatment vessel 1 where it is admixed with ion exchange material. The vessel 1 is shown as being provided with a mechanical impeller 2, but other agitating means can be employed, for example, vortex-inducing means. Prior to reaching the vessel 1, the effluent may be passed through a trash screen to remove suspended material, for example, congealed fats, agglomerates and other debris.

The parameters of the ion exchange treatment system, for example, the volume of the vessel 1, should be so selected that the mean contact time between the effluent and the ion exchange material is such as to give a optimum reaction. Treated effluent admixed with ion exchange material bearing pollutant material flows along a conduit 3 to a separator 4, which may comprise a filter or other solid/liquid separation device, for example, a centrifuge or settling tank. Separated ion exchange material, in suspension in some residual waste effluent, passes to a regeneration vessel 5. The major part of the purified effluent is discharge independently from the separator 4 through a conduit 6 and, if desired, is subjected to further purification.

The regeneration vessel 5 is shown as provided with a mechanical impeller 7 but, as in the case of the treatment vessel 1, other agitating means could be provided. An appropriate regenerant solution which may be, for example, caustic soda or common salt, is supplied to the regeneration vessel 5, and regenerated ion exchange material is recycled to the treatment vessel 1 through conduit 8. If desired, the regenerated material may be supplemented or partially replaced, either continuously or intermittently, with fresh ion exchange material introduced at a position following the vessel 5. Occasional complete replacement of the ion exchange material may also be necessary in some cases.

It may also be desirable from time to time to subject the ion-exchange cellulose to a cleaning treatment, for example, with caustic soda, to remove unwanted material (which could be, for example, fats) which may become attached thereto and detract from the efficiency of ion-exchange extraction of the dissolved material(s) concerned.

Instead of employing agitated conditions in the regenerating vessel, regeneration may be effected by steeping the ion exchange material with a regenerant solution in a non-agitated vessel. As a further possibility, regenerant solution may be allowed to percolate through a bed formed of the ion exchange material, or a parallel or countercurrent flow system may be used.

The eluate leaving the regeneration vessel through conduit 9 contains the pollutant material removed from the waste effluent in the treatment vessel 1 and may, if desired, be fed to a pollutant recovery system. Thus, for example, proteinaceous or fatty pollutants may be recovered by appropriate pH adjustment.

Figure 3:
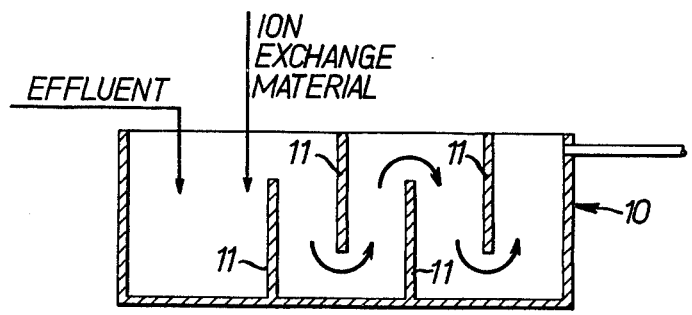
FIG. 3 is a vertical section view of a treatment vessel adapted for use in an embodiment process of the invention described with reference to FIG. 2.
Figure 2:
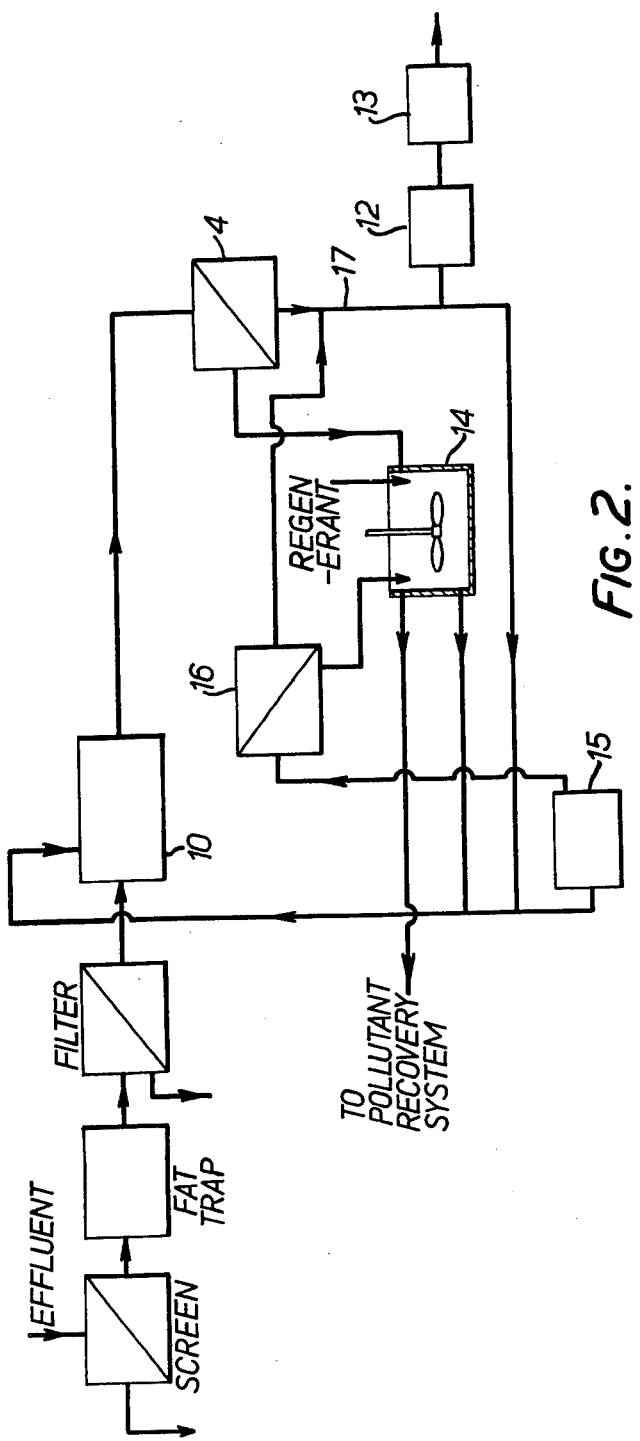

Referring to FIG. 2, waste effluent is passed in turn through a coarse screen to remove suspended solids, a fat trap, and a filter, and the filtered effluent is fed to a main treatment vessel 10. The vessel 10 may be an unbaffled stirred tank as shown at 1 in FIG. 1 or may be of the labyrinth type as shown in detail in FIG. 3. As shown in FIG. 3, a labyrinth vessel is provided with a number of vertical baffles 11 which define a series of generally vertical flow paths. Alternatively, a series of horizontal baffles, giving generally horizontal flow, could be used. Labyrinth vessels have the advantage that the contact time between reactants is more readily controllable than in an unbaffled tank. Means (not shown) are provided for agitating the contents of the labyrinth vessel, which means serve both to promote contact between the effluent and the ion exchange material and also to prevent or reduce undesirable settling of solid material.

In the vessel 10, the waste effluent is contacted with ion exchange material, and the major portion of the pollutant material in the effluent is thereby adsorbed onto the ion-exchange material. The treated effluent and admixed ion exchange material flows from the vessel 10 into a separator 4, which corresponds to that shown in FIG. 1. Purified effluent passes from the separator through a static reaction vessel 12 (in which further ion exchange treatment may be effected) and then through a polisher or deodorizer 13.

The reaction vessel 12 contains a static bed of ion exchange material, and serves to remove residual pollutant material and also as a trap for small particles of ion exchange material not removed in the separator 4. The ion exchange material in the vessel 12 is regenerated from time to time by any suitable means. Regeneration may, for example, be effected in situ or, if the material is of the same kind as used in the main treatment vessel 10, the spent material may be regenerated in the main regeneration vessel 14.

The polisher or deodorizer 13 may contain an activated carbon system, or a catalytic system suitable for removing dissolved organic substances.

In addition to or instead of being passed through the polisher or deodorizer 13, the purified effluent may be subjected to other purification treatment, for example, chlorination, aeration or other oxidizing treatment, or treatment to remove dissolved gases.

Ion exchange material recovered in the separator 4 is passed to a regeneration vessel 14, which may be provided with a stirrer as shown or with other agitating means. A suitable regenerant solution is supplied to the vessel 14, to de-sorb the extracted material. Regenerated ion exchange material is recycled to the main effluent treatment vessel 10 and/or to a secondary treatment vessel 15, in which once-purified effluent may be subjected to a further purification treatment performed under agitated conditions in accordance with the invention. The secondary treatment vessel may be a labyrinth vessel of the kind shown by way of example in FIG. 3, or may be an unbaffled stirred vessel as shown at 1 in FIG. 1. The mixture leaving the secondary treatment vessel 15, which comprises further-purified effluent and ion exchange material bearing pollutant material, passes to a secondary separator 16. Purified effluent leaving the secondary separator is conveyed to the main effluent discharge line 17, and the separated spent ion exchange material is passed to the vessel 14 for regeneration.

As in the case of the arrangement shown in FIG. 1, the eluate from the regeneration vessel may, if desired, be fed to a pollutant recovery system which may function, for example, by altering the pH of the eluate.

It will be appreciated that in the case of certain liquid effluents, the extracted material (referred to in connection with FIG. 2 as "pollutant material") will itself be a valuable product.

In a process of the kind illustrated in FIG. 2, involving a double purification treatment in accordance with the invention the contact time employed in the main and secondary treatment vessels may be the same or different, and each may be relatively short.

The arrangements shown in FIGS. 1 and 2 may be modified in a number of ways. For example, instead of using a single ion-exchange treatment vessel (1 or 10 respectively) a plurality of vessels may be used, disposed in series or in parallel. Further, there may be provided means for regulating the pH of the contents of the treatment vessel or vessels so as to ensure optimum ion exchange interaction.

Figure 4:
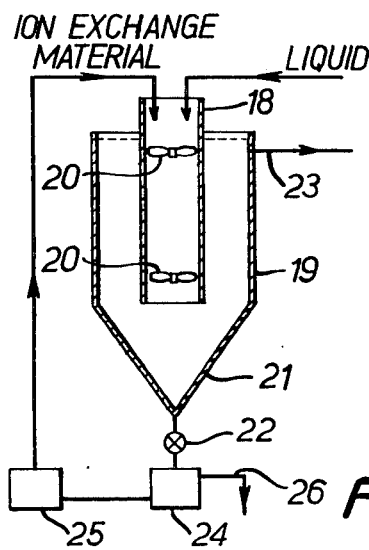

Referring to FIG. 4, the third form of method comprises simultaneously introducing ion exchange material, and liquid to be treated, into a vertical pipe-line reactor 18, which is housed within a vessel 19. As the admixed liquid and ion exchange material flow down the pipe 18, the mixture is agitated by impellers 20 spaced at intervals down the reactor. FIG. 4 shows two impellers, but any suitable number may be provided. Further, alternative local shear-intensive agitating means may be used.

At the outlet at the base of the pipe 18, the mixture comprises treated liquid and ion exchange material bearing extracted material adsorbed thereon. This mixture flows into the tapered settling zone 21 provided in the lowermost portion of the vessel 19. The ion exchange material settles out at the base of the settling zone 21, from which it is withdrawn by any suitable means (for example, a rotary valve or positive displacement pump 22, the latter giving especially good control over the quantity removed), and the treated liquid is withdrawn at the upper outlet 23.

The ion exchange material withdrawn through the pump 22 is filtered if necessary to remove residual treated liquid and is then regenerated in a vessel 24 to de-sorb the extracted material therefrom. The regenerated material is washed in a vessel 25 and then recycled to the pipe-line reactor 18, and the eluate from the regeneration vessel is discharged through outlet conduit 26 and treated, if desired, to recover the extracted material.

Figure 5:
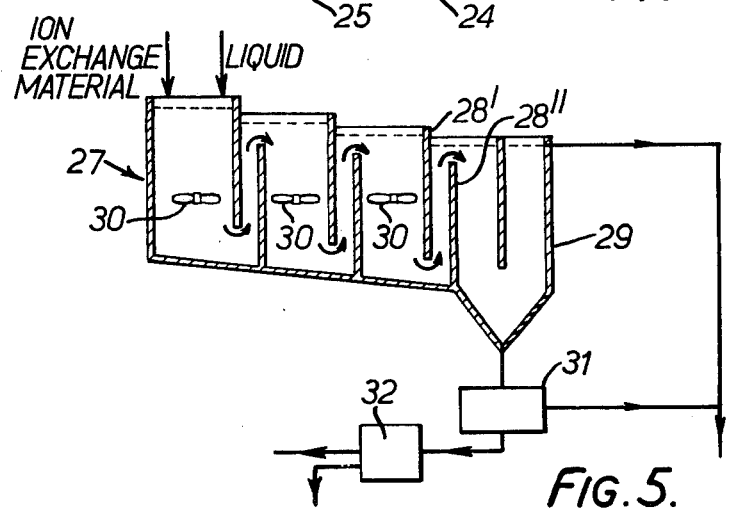

FIG. 5 shows a modified form of labyrinth vessel (indicated generally by the reference numeral 27) in which vertical baffles 28 are arranged in pairs, the baffles of each pair being closely juxtaposed to provide zones of relatively high velocity. Further, a baffled settling chamber 29 is arranged adjacent to the final pair of baffles (28' and 28") in the labyrinth vessel.

In operation, ion exchange material and liquid to be treated are introduced into the labyrinth vessel (which is provided with one or more impellers 30 or with other equivalent agitation-producing means), and treated liquid in admixture with used ion exchange material flows into the settling chamber 29. The ion exchange material, bearing matter extracted from the liquid medium, settles out at the base of the chamber, and is withdrawn therefrom into a separator 31, in which the material is freed from residual treated liquid.

Relatively dry ion exchange material is regenerated in a regeneration system 32, and regenerated material is recycled to the vessel 27. Eluate from the regenerator 32 is subjected to appropriate treatment to recover the material extracted from the liquid by the ion exchange process.

The bulk of the treated liquid leaves the settling chamber 29 through an upper outlet, which may be provided with a filter screen to prevent ingress of any ion exchange solids in that region.

Figure 6:
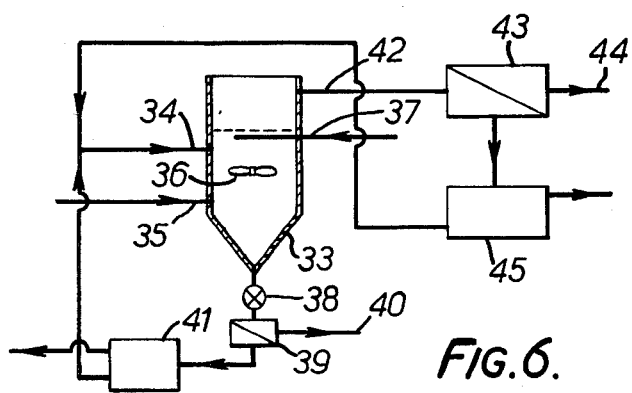

FIG. 6 is a flow-sheet, partly in diagrammatic form, of a process utilizing two ion exchange materials having opposed settling characteristics. In operation, a mixture of such ion exchange materials is introduced into a treatment vessel 33 through an inlet line 34.

Liquid to be treated (for example, liquid waste effluent that has already been subjected to preliminary screening as described hereinbefore with reference to FIG. 2) is introduced into the treatment vessel 33 through an inlet line 35. To promote optimum mixing and utilization of the ion exchange materials, there may be provided a dispersing plate or cone at the end of line 35.

Within the vessel 33, the admixed liquid and ion exchange materials are agitated by the action of an impeller 36, although it will be appreciated that other equivalent methods of producing agitated conditions may be employed instead.

The settling rates of the two ion exchange materials (dependent, as will be appreciated, on particle size and specific gravity) are such that one material descends to the base of the treatment vessel, and the other material rises, assisted, if necessary, by the flotation action of gas (preferably air) introduced at 37.

A suspension of one ion-exchange material in treated liquid is withdrawn from the base of the vessel by a suitable pump or extractor valve 28, and conveyed to a separator 39, from which treated liquid is discharged through a conduit 40, and separated solids are transferred to a regenerator 41.

Regenerated ion exchange material is recycled to inlet 34, and the eluate from the regenerator is, if desired, subjected to further treatment to recover the dissolved material extracted in the treatment vessel 33.

A suspension comprising treated liquid and the other ion-exchange material flows from an outlet 42 located near the top of the treatment vessel 33, and is then handled in a manner similar to that used for the first material. Thus, treated liquid leaves a separator 43 through a conduit 44, and separated spent ion exchange material is regenerated at 45 and then recycled to the treatment vessel 33. Eluate from the regenerator 45 may be treated for recovery of dissolved material.

The following Examples illustrate the invention:

EXAMPLE 1

Waste effluent having a protein concentration of 7.55 gm./l. was fed at a rate of 0.57 l./min. to a reaction vessel of 5 liters capacity, in which agitated conditions were produced by an impeller. Simultaneously, a cellulosic ion exchange resin was admitted to the vessel at a rate of 9.46 gm/min.

The cellulosic ion-exchange material was a non-cross-linked material made by reacting cellulose with 2-chloro triethyl amine hydrochloride and then regenerating the activated cellulose so obtained (as described, for example, in British patent specification No. 1,387,265). The material had an ordinary ion exchange capacity (I.E.C.) of 0.68 and the protein adsorption was effected at pH 9.

Admixed treated effluent and reacted ion exchange resin were continuously transferred to a settling tank of 15 l. capacity and of inverted conical form. protein-loaded ion exchange resin and treated effluent were withdrawn through separate outlets of the settling vessel.

The protein content of the treated effluent was 0.85 gm./l., representing a removal efficiency of 87.8%. The protein uptake of the ion exchange resin was 404 mg./gm.

Extracted protein was isolated by regenerating the reacted resin in a stirred vessel of 5 liters capacity, using a 5% solution of sodium chloride introduced at 0.36 l./min. Throughput of the resin was 31.8 gm./min. and the eluate and regenerated resin were separated in a 15 l. settling tank. The regenerated resin was washed and then recirculated to treat further effluent, and the protein was precipitated from the eluate by adding HCl and heating to 40°-50° C., whereupon readily filtrable flocs were formed.

On a larger scale, the process of Example 1 may be operated with a waste effluent input rate of 5-20 l./min. into a 30 gallon agitated vessel. Ion exchange resin may be introduced at up to 1 Kg./min. and separation may then be effected in a 90 gallon settling tank.

For the regeneration and washing stages, 5 gallon stirred vessel and 15 gallon settling tanks may be used.

EXAMPLE 2

A pilot plant was constructed and operated essentially in accordance with the principles illustrated by FIG. 1 of the drawings. The system was used to extract proteinaceous material from a liquid waste abattoir effluent at pH 9 by means of a non-cross-linked diethyl-aminoethyl regenerated cellulose ion-exchange material similar to that used in Example 1.

The process was operated on a continuous basis, that is to say, the throughput of ion-exchange material in the adsorption stage (unit 1 in FIG. 1) was equal to that in the de-sorption or "regeneration" stage (unit 5 in FIG. 1). De-sorption was effected using salt as in Example 1.

The pilot plant was operated with a batch of the cellulosic ion-exchange material for a period of three months, during which the ion-exchange material was recirculated approximately 1000 times. To provide a measure of the mechanical deterioration of the cellulosic material over that period, its initial particle size distribution was compared with the final distribution. The particle size distribution was determined in each case from the proportion of each of a series of separate samples retained by a corresponding number of sieves of different mesh size.

The results obtained were as follows:

| Particle size (mesh size B.S.S.) | Initial Distribution | | Distribution % after 3 months | |
|---|---|---|---|---|
| 420 | 7.61 | | 0.51 | |
| 355–420 | 28.69 | } = 91.89% | 23.88 | } = 93.85% |
| 300–355 | 50.10 | | 59.70 | |
| 210–300 | 13.10 | | 10.27 | |
| 180–210 | 1.60 | | 5.64 | |
| | 100.00 | | 100.00 | |

It was also established that the actual loss of cellulosic material, including that arising from formation of particles which were too small to separate from the treated waste effluent, was only 5% over the whole 1000-cycle period, or an average loss of 0.005% per cycle. Also, no significant tendency was observed toward the formation of a highly viscouse unprocessable solution or "gel."

The results shown above indicate surprisingly little change in the overall particle size distribution, especially in the middle range, and very little actual loss of cellulosic material. Taking into account the absence of gelation, the results taken as a whole indicated no significant mechanical deterioration of the cellulose ion-exchange material into unacceptably fine particles even after relatively prolonged operation. This was a surprisingly good result, and demonstrated the viability in commercial terms of the method according to the invention.

In cases where it is desired to use the spent ion exchange material as a starting material for further processing of the extracted material carried thereby, the processes described with reference to the drawings may be modified by removing at least part of the spent material isolated in the various separators and using the removed material, without regeneration or recycling, in such further processing.

We claim:

1. An ion-exchange process for extracting dissolved material from a liquid medium, which comprises;
   (a) providing a particulate cellulosic ion-exchange material selected from the group consisting of non-cross-linked cellulosic ion-exchange materials and cellulosic ion-exchange materials cross-linked to an extent not greater than 10% (expressed in terms of the weight of the cross-linking agent and the dry weight of the cellulose);
   (b) causing ion-exchange interaction between the liquid and the cellulosic ion-exchange material by suspending the cellulosic material in the liquid in a reaction vessel under agitated conditions which are such that the cellulosic particles are in mutual relative motion and in motion relative to the vessel, said agitated conditions being produced by agitator means located within the reaction vessel and acting directly on the suspension of cellulosic particles in the vessel; and
   (c) separating reacted ion-exchange material bearing the extracted material from the resulting mixture of reacted ion-exchange material and treated liquid.

2. An ion-exchange process according to claim 1, wherein the agitator means comprises at least one impeller.

3. An ion-exchange process according to claim 2, wherein the impeller is part of a pump which causes circulation of the said suspension in and out of said vessel.

4. An ion-exchange process according to claim 1, wherein at least part of the separated ion-exchange material is used to treat a further quantity of liquid in the reaction vessel.

5. An ion-exchange process according to claim 4, wherein said further quantity of liquid comprises liquid that has already been subjected to steps (b) and (c) at least once.

6. An ion-exchange process according to claim 4, wherein the ion-exchange material is used to treat said further quantity of liquid without intervening regeneration.

7. An ion-exchange process according to claim 4, wherein at least part of the separated ion-exchange material is regenerated to de-sorb extracted material therefrom and is then re-circulated to treat said further quantity of liquid.

8. An ion-exchange process according to claim 7, wherein the sequence comprising steps (b) and (c) and the subsequent regeneration and re-circulation is repeated at least ten times for a given quantity of the cellulosic ion-exchange material.

9. An ion-exchange process according to claim 1, wherein the separation is carried out in a separate zone to which the said mixture is transferred from the reaction zone.

10. An ion-exchange process according to claim 1, wherein there is a continuous flow of said liquid into and through the reaction vessel.

11. An ion-exchange process according to claim 1, in which the separated ion-exchange material is regenerated to de-sorb extracted material therefrom, and which is a continuous process wherein the throughput of ion-exchange material in steps (b) and (c) is substantially equal to the throughput in the regeneration step.

12. An ion-exchange process according to claim 1, wherein the cellulosic ion-exchange material is cross-linked to an extent not greater than 5%.

13. An ion-exchange process according to claim 1, wherein the cellulosic ion-exchange material selected is non-cross-linked.

14. An ion-exchange process according to claim 1, wherein the extracted material comprises an organic polyelectrolyte.

15. An ion-exchange process according to claim 1, wherein the extracted material is selected from the group consisting of proteins, carbohydrates, nucleic acids, dyestuffs, long-chain fatty acids and quaternary ammonium compounds.

16. An ion-exchange process according to claim 1, wherein the cellulosic ion-exchange material is one based on a regenerated cellulose.

17. An ion-exchange process according to claim 16, wherein the cellulosic ion-exchange material is one made by reacting cellulose or a cellulose derivative with an activating substance containing one or more ionisable chemical groups which impart ion-exchange properties to the cellulose reaction product, and thereafter regenerating that product.

18. An ion-exchange process for extracting dissolved material from a liquid medium, which comprises;
   (a) providing a particulate cellulosic ion-exchange material selected from the group consisting of non-cross-linked cellulosic ion-exchange materials and cellulosic ion-exchange materials cross-linked to an extent not greater than 10% (expressed in terms of the weight of the cross-linking agent and the dry weight of the cellulose);
   (b) causing ion-exchange interaction between the liquid and the cellulosic ion-exchange material by suspending the cellulosic material in the liquid in a reaction vessel under agitated conditions which are such that the cellulosic particles are in mutual relative motion and in motion relative to the vessel, said agitated conditions being produced by turbulence-inducing means selected from the group consisting of means for inducing vortex conditions in the reaction vessel and jet means for introducing said liquid medium into the vessel; and (c) separating reacted ion-exchange material bearing the extracted material from the resulting mixture of reacted ion-exchange material and treated liquid.

19. A continuous process for extracting dissolved chemical compounds from a liquid medium, which comprises;
(a) providing a particulate, cellulosic, ion-exchange material selected from the group consisting of non-crosslinked cellulosic ion-exchange materials and cellulosic ion-exchange materials cross-linked to an extent not greater than 10 percent (expressed in terms of the weight of the cross-linking agent and the dry weight of the cellulose);

(b) suspending said ion-exchange materials in a first liquid medium;
(c) agitating the suspension whereby the cellulosic particles are in motion in the liquid medium and are in substantial mutual relative motion;
(d) reacting the dissolved chemical compounds with the ion-exchange materials while agitating;
(e) separating reacted ion-exchange material from the liquid medium;
(f) regenerating the separated ion-exchange material;
(g) suspending the regenerated ion-exchange material into another liquid medium containing dissolved chemical compounds; and repeating steps (c)–(b) a plurality of times.

* * * * *

UNITED STATES PATENT AND TRADEMARK OFFICE
CERTIFICATE OF CORRECTION

PATENT NO. : 4,154,675
DATED : May 15, 1979
INVENTOR(S) : George E. Jowett, et al It is certified that error appears in the above-identified patent and that said Letters Patent are hereby corrected as shown below:

At Column 11, line 37, - "28" should be -- 38 --

At Column 12, line 5, - "protein" should be -- Protein --

At Column 16, line 13, - "(c)-(b)" should be -- (c)-(g) --

Signed and Sealed this

Twenty-fifth Day of December 1979

[SEAL]

Attest:

SIDNEY A. DIAMOND

Attesting Officer

Commissioner of Patents and Trademarks